United States Patent [19]

Spragg

[11] Patent Number: 5,902,528
[45] Date of Patent: May 11, 1999

[54] METHOD OF MAKING AN ARTICLE FROM A LIGHTWEIGHT CEMENTITIOUS COMPOSITION

[76] Inventor: Peter H. Spragg, 18 Rockland Rd., Weare, N.H. 03281

[21] Appl. No.: 08/876,040

[22] Filed: Jun. 13, 1997

[51] Int. Cl.⁶ .................................................. B28B 3/00
[52] U.S. Cl. ............................ 264/42; 264/71; 264/333; 264/338; 264/DIG. 7; 249/144; 425/412; 425/421
[58] Field of Search ............................. 264/42, 71, 333, 264/DIG. 7, 338; 249/144; 425/412, 421

[56] References Cited

U.S. PATENT DOCUMENTS

| | | |
|---|---|---|
| 163,993 | 6/1875 | Hardy . |
| D. 254,092 | 1/1980 | Slade .................................... D25/77 |
| D. 312,802 | 12/1990 | Bedard .................................. D11/118 |
| 3,170,587 | 2/1965 | Beeber . |
| 3,847,633 | 11/1974 | Race ........................................ 106/98 |
| 3,848,040 | 11/1974 | Confer et al. ............................. 264/86 |
| 3,860,214 | 1/1975 | Schmidgall ............................. 249/144 |
| 3,869,295 | 3/1975 | Bowles et al. ..................... 264/DIG. 7 |
| 4,057,608 | 11/1977 | Hashimoto et al. ..................... 264/42 |
| 4,100,115 | 7/1978 | Baer ........................................ 521/83 |
| 4,165,999 | 8/1979 | Egner ..................................... 264/308 |
| 4,372,092 | 2/1983 | Lopez ...................................... 52/612 |
| 4,518,431 | 5/1985 | Duvier, Jr. ............................. 106/97 |
| 5,074,517 | 12/1991 | Scott ...................................... 264/338 |
| 5,080,022 | 1/1992 | Carlson .................................. 106/698 |
| 5,114,617 | 5/1992 | Smetana et al. ....................... 252/378 |
| 5,207,830 | 5/1993 | Cowan et al. .......................... 106/672 |
| 5,250,578 | 10/1993 | Cornwell ................................. 521/83 |
| 5,337,792 | 8/1994 | Tempel ..................................... 138/96 |
| 5,387,282 | 2/1995 | Jakel ...................................... 106/675 |
| 5,478,391 | 12/1995 | Babaev et al. ......................... 106/725 |
| 5,580,378 | 12/1996 | Shulman ................................. 106/677 |
| 5,676,905 | 10/1997 | Anderson et al. ....................... 264/42 |

OTHER PUBLICATIONS

Perlite Institute, Inc., Perlite Technical Data Sheet/No. 4–3 1980, New York, N.Y.
Grefco, Inc., Permalite Perlite Construction Aggregate, Westchester, IL.
Whittemore Perlite Co., Inc., "Easy" Mix Design Chart, Andover, MA.
Technical Brochure Permalite 07200/GRE, BuyLinc 2772.

Primary Examiner—James Derrington
Attorney, Agent, or Firm—Bourque & Associates P.A.

[57] ABSTRACT

A method of making an article from a lightweight cementitious composition includes molding a castable cementitious mixture including an aqueous slurry of at least perlite and concrete into an article, such as a hollow, decorative article. The castable cementitious mixture can include a fibrous material, for reinforcing the cement and perlite, and an air entraining agent, for facilitating mixability and reducing a density of the cementitious mixture and facilitating casting. The mold can include an external mold form that contains the cementitious mixture and an internal mold form that displaces the cementitious mixture within the external mold form to cast the hollow article in various shapes and with various surface textures. The external and internal mold forms include liners made of a lightweight flexible material that can be removed, unfolded, and prepared and/or cleaned.

30 Claims, 5 Drawing Sheets

METHOD OF MAKING AN ARTICLE FROM A LIGHTWEIGHT CEMENTITIOUS COMPOSITION

FIELD OF THE INVENTION

The present invention relates to methods of making molded articles from a lightweight cementitious composition and in particular, to a method of making an article from a cement and perlite composition, and a hollow, decorative article made therefrom.

BACKGROUND OF THE INVENTION

Many property owners have sought to conceal unsightly utility installations, such as water well heads, septic vent stacks, telephone junction boxes, and buried gas tank hatches. Existing concealment devices, such as plantings, planters, and well houses have provided only partial or seasonal concealment of the utility installations. Such existing concealment devices are also not sufficiently weatherproof and are susceptible to damage caused by sun, rain, ice, and wind. Other concealment devices, such as well houses, are large heavy structures that are difficult to install and remove and could also present a hazard individuals nearby.

A device is needed that will adequately conceal utility installations in all seasons while providing an aesthetically pleasing appearance that blends with the natural surroundings. A concealment device is also needed that is structurally sound and weather resistant to withstand sun, rain, snow, ice and wind while being sufficiently light weight to be easily installed and moved. Furthermore, a concealment device is needed that can be made with various different shapes and surface ornamentation's. Additionally, there is also a need for lightweight outdoor decorative objects such as posts, birdbaths, etc., that are aesthetically pleasing, yet can be purchased, moved and installed by a typical homeowner, without need for a heavy duty truck or similar delivery vehicle or heavy installation equipment.

Cementitious compositions are commonly used to form structures and articles in the building industry. Although cementitious compositions, such as concrete or cementitious compositions including other aggregates, are desirable in terms of price and weather resistance, the use of cementitious compositions to form a decorative article or a concealment device for covering utility installations presents a number of other problems related to the physical characteristics of the material and the methods of using the material.

Using concrete, for example, to form a generally hollow article for covering utility installations results in an article that is heavy and difficult to install or move. To minimize the weight of a hollow article made from concrete, the thickness of the walls of the article would have to be dangerously thin, thereby sacrificing the structural integrity of the article. Molding structures or articles from concrete is also labor intensive. Concrete is thus difficult to form into a lightweight article having various decorative shapes and does not provide a decorative surface texture or appearance.

Lightweight cementitious compositions including perlite, a siliceous volcanic rock which has been expanded by heating, have been used in the building construction field as a lightweight insulating concrete for roof decks, floor systems, sound/firewalls, and other insulating applications. However, the prior art does not disclose the use of a lightweight cementitious composition to cast a hollow, decorative article with various shapes and surface textures. Typical perlite concrete compositions also do not provide sufficient strength and weatherability.

Accordingly, a need exists for a hollow, decorative article that is made from a cementitious composition and is lightweight, easily installable, weather-resistant, easily molded to a desired shape, for example a shape that conceals a utility installation, and has a decorative shape and surface texture. A need also exists for a method of making such an article from a lightweight cementitious composition by casting the article with various shapes, surface textures and other decorative features.

SUMMARY OF THE INVENTION

The present invention features a novel method for making an article from a cementitious composition and also features a hollow, decorative article made according to the method. The method comprises the steps of: mixing a castable cementitious mixture including an aqueous slurry of at least cement and perlite; transferring a quantity of the castable cementitious mixture into a mold having an internal mold form and an external mold form; maintaining the castable cementitious mixture between the internal mold form and the external mold form until the castable cementitious mixture at least partially cures to form the article; and removing the external mold form and the internal mold form from the article. The preferred method includes inserting an internal mold form into the external mold form and the quantity of the castable cementitious mixture, for displacing the quantity of the castable cementitious mixture between the internal mold form and the external form. One method of making a decorative article from a cementitious composition further includes one or more steps of finishing the surface of the molded article, such as by carving.

The preferred cementitious mixture includes portland cement and a perlite/cement ratio of about 4:1 by volume. The castable cementitious mixture also preferably includes an air-entraining agent, for entraining air bubbles, improving mixability and reducing a density of the castable cementitious mixture to facilitate displacement of the castable cementitious mixture by the internal mold form. The castable cementitious mixture further preferably includes a fibrous material, such as polypropylene fibers, for reinforcing the castable cementitious mixture.

The preferred step of mixing includes: adding water to a heated mixing apparatus; mixing the air entraining agent into the mixing apparatus until dispersed in the water; mixing the cement in the mixing apparatus until a cementitious slurry is formed; mixing the perlite into the cementitious slurry in the mixing apparatus until a cementitious perlite slurry is formed with entrained air; and mixing the fibrous material into the cementitious perlite slurry in the mixing apparatus, for forming the castable cementitious mixture. The perlite is preferably mixed into the cementitious slurry by feeding the perlite with a material feeding device.

The preferred method further includes a step of preparing the external mold form with a retarding/parting agent, for slowing curing of the castable cementitious mixture at an outer surface region of the article and for facilitating separation of the external mold form from the article. The external mold form liner is preferably made of a light weight flexible material such that the external mold form can be unfolded and prepared with the retarding/parting agent. The preferred method further includes preparing the internal mold form with a parting agent, such as a plastic film, that also prevents crazing of the castable cementitious mixture upon curing.

The present invention also features a method for making an article with a decorative surface texture from a cementitious composition. The method comprises the steps of: mixing a castable cementitious mixture including an aqueous slurry of at least cement and perlite; preparing a surface of the mold with a retarding agent; pouring a quantity of the castable cementitious mixture into a mold; casting the castable cementitious mixture in the mold until the castable cementitious mixture substantially cures to form the article; and removing the article from the mold. The retarding agent slows down curing of the article at an external surface region of the article such that the perlite and concrete form a decorative surface texture. This method preferably includes a further step of finishing the outer surface of the region of the article upon removal of the article from the mold.

One embodiment of the retarding agent includes a mixture of at least water, sugar and glue. The preferred embodiment of the retarding agent further includes a solvent alcohol in the mixture. One example of the retarding agent further includes a pigment for indicating a density of application of the agent and a degree of penetration of the retarding agent. The glue includes either white or yellow glue and preferably both.

A decorative molded article made according to this method includes a body portion formed when the castable cementitious mixture cures between the external and internal mold forms. The body portion includes a plurality of walls defining a hollow internal region, for covering a structure, such as a utility installation. At least one of the plurality of walls includes an outer surface region having a decorative texture. According to various embodiments of the hollow, decorative article, the body portion further includes one or more apertures extending through one or more of the plurality of walls, for venting the hollow region of the body portion. The article can also include a recessed top region, for receiving water and/or earth material, or a flat, peaked or domed top region.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
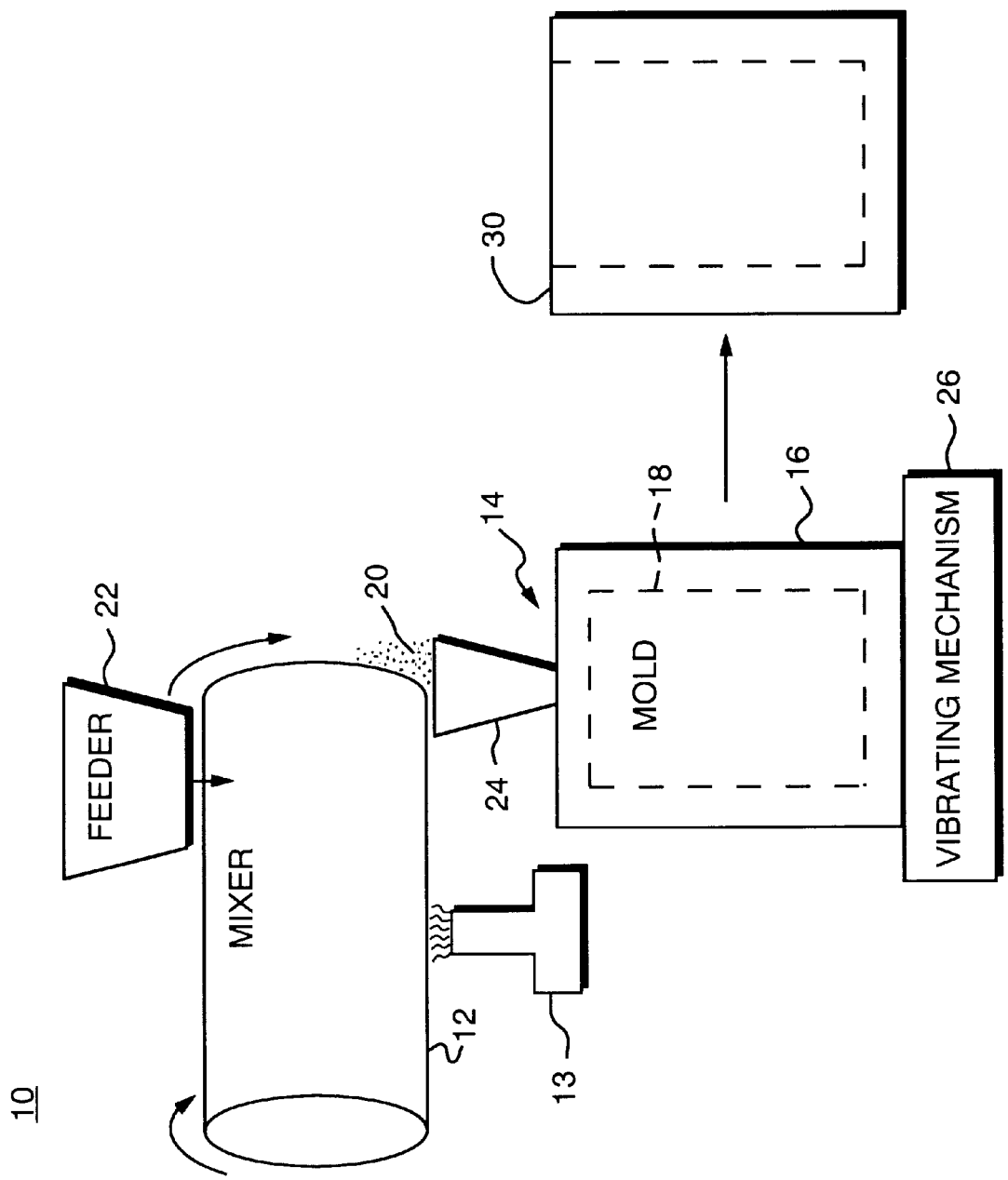
FIG. 1 is a schematic view of a system for molding an article from a cementitious composition, according to the present invention.

The system and method 10, shown schematically in FIG. 1, according to the present invention, mixes a castable cementitious mixture 20 including cement and perlite and forms a molded article by molding or casting the castable cementitious mixture into a desired shape. The system 10 includes at least a mixer or mixing apparatus 12, for mixing the castable cementitious mixture 20, and a mold 14. In the preferred embodiment, the mold 14 includes an external mold form 16 and an internal mold form 18, for casting the cementitious mixture 20 into the molded article. According to the exemplary embodiment, the molded article is a hollow, decorative article, such as a decorative lawn ornament, or a cover or cap for utility installations including, but not limited to, water wellheads, septic vent stacks, telephone junction boxes, and buried gas tank hatches. The present invention, however, contemplates using the system and method 10 of the present invention to make other types of molded articles from various types of cementitious compositions.

The mixing apparatus 12 preferably includes a conventional drum type mixer heated with a drum heater 13, such as a kerosene convection heater, before and/or after mixing begins. Drum type mixers are relatively easy to clean and help to control the diffusion of airborne silica dust, a component of the perlite. The present invention also contemplates using paddle type mixers or other mixers known to those of ordinary skill in the art for mixing cementitious mixtures.

The system 10 can also include a material feeding device 22, such as a hopper with an auger drive, that gradually feeds the perlite into the cementitious mixture 20 in a steady, controlled manner. The material feeding device 22 thereby eliminates spillage of the perlite, reduces the airborne diffusion of silica dust, and minimizes excessive loading of perlite onto the mixer walls. The material feeding device can also include a coarse meshed screen or grill to filter larger clumps of perlite.

The castable cementitious mixture 20 preferably includes an aqueous slurry of at least cement, such as portland cement, and perlite, such as a cement grade perlite of the type manufactured by Whittemore Perlite Company, Inc. Of Andover, Mass. An exemplary ratio of perlite to cement of about 4 to 1 by volume typically provides the desired strength/weight characteristics for a hollow, decorative article. The present invention contemplates other proportions having an amount of cement sufficient for the desired strength and hardness properties and an amount of perlite sufficient to make the product castable and lightweight.

The preferred castable cementitious mixture 20 further includes a fibrous material, such as chopped polypropylene fiber sold under the trademark Fiberstrand 100 by Euclid Chemical Co., that reinforces the cementitious composition. The fibrous material should be present in a quantity sufficient to reinforce the cement and perlite particles during curing of the cementitious mixture and during handling of the molded articles (e.g. about ½ lb. Or 0.3% by weight, thereby preventing disintegration and abrasion of the molded articles. The fibrous material is preferably not mixed in a quantity that will cause entrapment of large air bubbles in the cementitious mixture 20, thereby causing structural weaknesses and surface cavities in the hollow, decorative articles.

According to the exemplary embodiment, the castable cementitious mixture 20 further includes an air entraining agent, such as the type sold under the trademark DARAVAIR-M manufactured by W. R. Grace, that causes air entrainment or small bubbles to form in the cementitious mixture. The air entraining agent causes the cementitious mixture 20 to form a foam or lather consistency with a reduced density, and thereby facilitates hollow-core casting of the castable cementitious mixture between the external mold form 16 and the internal mold form 18, as will be described in greater detail below. Note that air entrainment (or small bubbles) in the cementitious mixture is desirable to facilitate the casting while air entrapment (or large air bubbles) in the cementitious mixture is undesirable because larger bubbles adversely affect the strength and surface texture of the molded articles.

The present method generally includes mixing the above materials in the mixing apparatus 12 containing a quantity of warm water. The air entraining agent (if used) is preferably mixed first into the warm water until well dispersed throughout, typically about 5 to 10 seconds. The cement is then preferably mixed into the water until the cement is saturated with the water and forms a cementitious slurry, typically 4 minutes. The perlite is then mixed gradually into the cementitious slurry, e.g. with the feeding device 22, to form a cementitious perlite slurry with air entrainment. The fibrous material is then mixed into the cementitious perlite slurry until dispersed throughout.

EXAMPLE 1

According to one example of the castable cementitious mixture, the following materials in the approximate amounts set forth below were used.

| Material | Volume | Weight (lbs.) | % by weight |
|---|---|---|---|
| Perlite | ~4 cu. ft. | ~30 | ~16.1 |
| Cement | ~1 cu. ft. | ~94 | ~50.4 |
| Water (~120° F.) | ~7.3 gal. | ~61.4 | ~33.0 |
| Fiber | — | ~.5 | ~.3 |
| Entraining Agent | ~5 fl. oz. | ~.31 | ~.2 |

According to this example, the drum mixer was preheated to approximately 100–110 degrees and rotating at about 30 rpm, and the warm water was added to the mixing apparatus 12. The air entraining agent was added to the water and mixed until well dispersed. The portland cement was mixed into the water one-half bag at a time to minimize loading of the cement onto the mixer walls. The cement was mixed with the water for about 4 min. until the cement was saturated with water and formed a cementitious slurry having a "creamy" consistency. Any cement paste on the walls of the mixer was blasted with about 1 cup of additional water.

The perlite was then gradually mixed into the cementitious slurry at a rate of about 1 cu. ft. per minute forming a cementitious perlite slurry. The walls of the mixer were again rinsed with water (e.g. not more than 3 cups). The cementitious perlite slurry was mixed for about 8 minutes until forming a foam-like or lather consistency caused by the air entraining agent. The chopped, dry polypropylene fiber (¾ inch in length) was then added, breaking up the larger clumps of fiber. The slurry was then further mixed for about 3 additional minutes for a total of about 15 minutes from the time that the cement is added to the water, until the slurry had a light consistency and the mixer speed was dropped to the lowest setting.

The particular materials, quantities, and mixing times described above are merely one example and are not intended to be a limitation on the present invention. The castable cementitious mixture described above has a density and consistency that is easily cast into a hollow, decorative article with a desired shape and surface texture, as described in greater detail below. The castable cementitious mixture described above cures to form a hollow, decorative article that is sufficiently lightweight to be easily moved and installed over a utility installation, sufficiently strong and abrasion resistant to prevent damage when moving or installing, and sufficiently weatherproof to prevent damage from sun, rain, ice and wind. The present invention contemplates other types of materials in varying quantities and proportions as well as various mixing times and sequences depending upon the desired characteristics of the castable cementitious mixture and the resulting article molded therefrom. For example, fine masonry sand, baked or bisqued shale, or other harder aggregate materials could be added to the mixture to increase abrasion resistance. The present invention also contemplates the addition of a chemical accelerator to the cementitious mixture as well as a water reducing admixture.

Once the castable cementitious mixture 20 has been formed, the mixture 20 is transferred to the mold 14. The system 10 preferably includes a transfer device 24 that receives the mixture 20 from the mixing apparatus 12 and guides the mixture 20 into the external mold form 16 while minimizing air entrapment. When the desired quantity of castable cementitious mixture 20 is deposited into the mold 14, the mixture is allowed to cure between the external mold form 16 and the internal mold form 18 to form a molded article 30 having a plurality of walls defining a hollow region, as will be described in greater detail below.

The system 10 preferably includes a vibrating mechanism 26, for vibrating the mold 14, thereby facilitating the molding of the cementitious mixture between the external mold form 16 and internal mold form 18 and dispelling entrapped air. One example of the vibrating mechanism 26 is a vibrating table that provides between about 3600 to 8000 vib/min, preferably with a vertical vibration component.

Prior to transferring the cementitious mixture to the mold, a parting agent is preferably applied to the internal mold form 18 and external mold form 16 to facilitate removal of the article 30 from the external and internal mold forms 16, 18. One example of the parting agent used on the internal mold form 18 includes a plastic film applied around the internal mold form 18, as will be described in greater detail below. The plastic film also acts as a sealing agent that seals the castable cementitious mixture after form removal and during curing to prevent shrinkage and crazing of the cementitious mixture.

One example of the parting agent used on the external mold form 16 is a retarding/parting agent that retards or slows the curing of the outer surface of the article 30 while also facilitating the separation of the article 30 from the external mold form 16. As a result of the slowed curing process at the outer surface region of the article, the perlite and cement in the cementitious mixture can form a decorative texture that simulates a fine grained granite.

One type of retarding/parting agent includes a mixture of at least water, sugar and glue. The sugar, such as corn syrup, has a retarding effect on the setting action of the cementitious mixture. The glue, such as a white glue and/or a yellow aliphatic resin wood glue, both of the type made by Elmer's, provides a high bodied consistency that allows the agent to cling easily to vertical surfaces of the external mold form 16. The preferred retarding/parting agent further includes solvent alcohol. The mixture of glue with solvent alcohol results in a composition having a unique webbing property and further enhances the consistency of the retarding agent. The resulting retarding agent dries relatively quickly and is time-released to allow for the cementitious mixture to flow between the external and internal mold forms.

One example of the retarding agent further includes a pigment, such as Superconcentrated Mortar Color #891 Black (i.e. carbon black) made by the Euclid Chemical Co., for indicating a density of application of the agent and a degree of penetration of the retarding agent. The retarding/parting agent can be applied to the external mold form 16 by brushing or could also be reduced with water (e.g. about 10%) and sprayed onto the external mold form 16.

EXAMPLE 2

According to one example of the retarding/parting agent, the following materials in the approximate amounts set forth below were used.

| Ingredient | Min. Batch Volume |
| --- | --- |
| Carbon Black | ~2 tsp. |
| Water | ~5 tsp. |
| Corn Syrup | ~3 tblspns. |
| Yellow Glue | ~5 fl. oz. |
| White Glue | ~10 fl. oz. |
| Solvent Alcohol | ~16 fl. oz. |

The above example of the retarding/parting agent was made by first mixing in a container the carbon black and a small amount of the water to form a paste. The remaining water was then added gradually while mixing thoroughly. The corn syrup (pre-heated) was then added and mixed with a high speed hand mixer. The yellow glue was then added and mixed with the mixer, and then the white glue was added and mixed with the mixer. The mixture was allowed to sit while pouring the solvent alcohol into a separate container. The glue mixture was then pre-mixed by pouring into the solvent alcohol through a fine funnel such that glue flows as a thread into the solvent alcohol. The glue mixture and alcohol were then mixed to form the retarding/parting agent.

The particular ingredients, quantities, and mixing sequences described above are merely one example and are not intended to be a limitation on the present invention. The present invention contemplates using the retarding/parting agent in other applications with other types of cementitious compositions and molding methods. The present invention also contemplates other applications for the unique mixture of glue, such as white or yellow wood glue, with solvent alcohol to form a composition having high webbing and high clinging characteristics.

Figure 2:
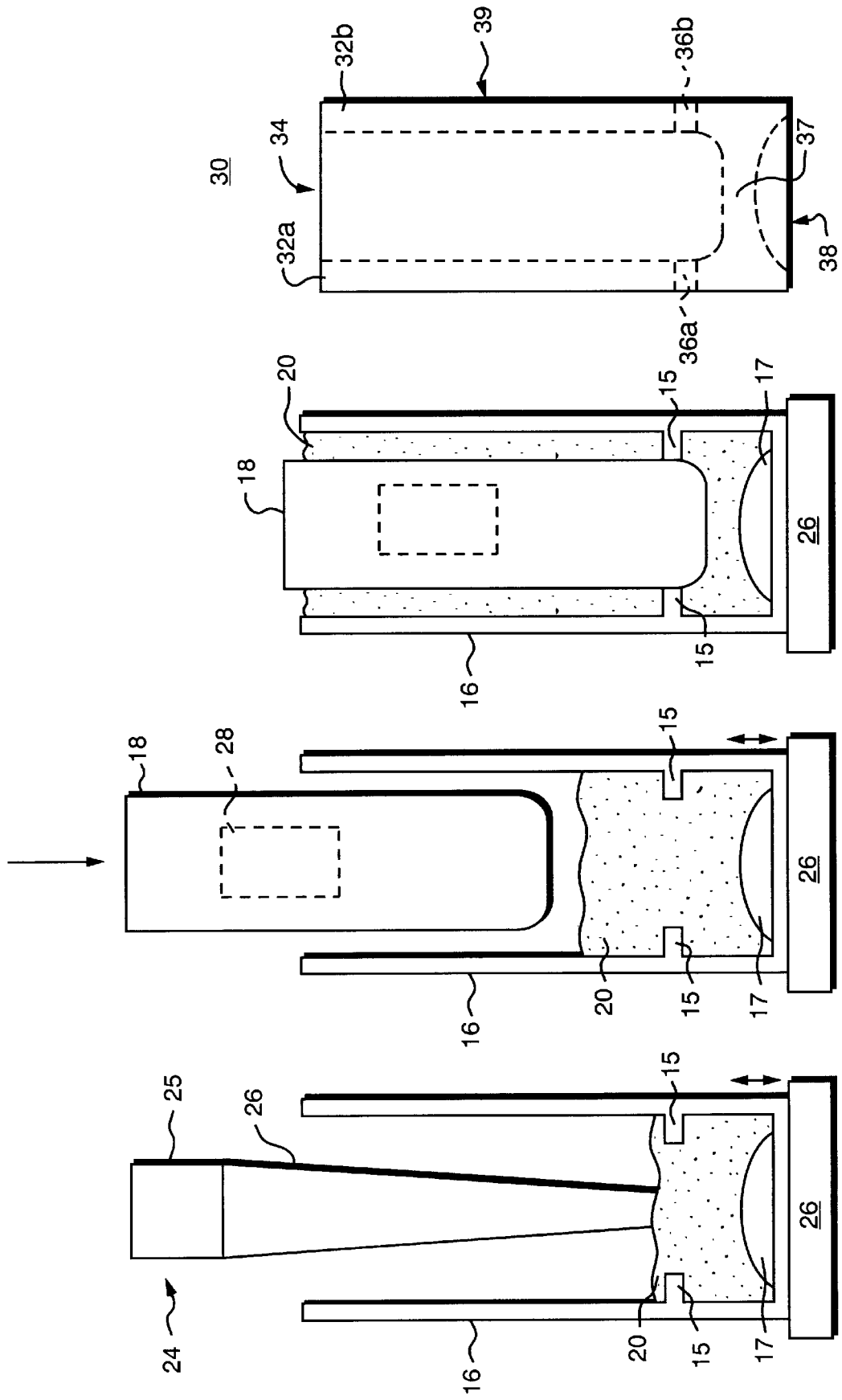
FIGS. 2A–2D are schematic views of the method for molding an article from a cementitious composition using an external mold form and an internal mold form, according to the present invention.

The method of molding a hollow, decorative article includes first depositing the castable cementitious mixture 20 into the external mold form 16, FIG. 2A. One example of the transfer device 24 includes a bottomless bucket 25 and a tube 26, preferably made of a cement proof fabric, extending from the bucket 25. The preferred method of using the transfer device 24 is by first pouring the cementitious mixture into the bucket 25, for example, using a funnel having a sliding funnel valve that controls the passage of the mixture through the spout of the funnel into the bucket 25. The funnel receives the mixture immediately upon discharge from the mixing apparatus 12, allowing the mixture to remain intact and eliminating potential air pockets.

The bucket 25 receives the mixture while the tube 26 is folded across the open bottom of the bucket 25. When the bucket 25 is full, the bucket 25 and tube 26 are moved into the external mold form 16 and the cementitious mixture in the bucket 25 is released into the tube 26 by unfolding the tube and extending the tube from the bucket 25. The tube 26 directs the cementitious mixture 20 to a bottom region of the external mold form 16 while maintaining the cementitious mixture 20 as one contiguous mass that falls at a controlled velocity. The tube 26 thereby minimizes air entrapment in the cementitious mixture during transfer of the cementitious mixture 20 to the mold 14. The vibrating mechanism 26 can be actuated to facilitate the elimination of entrapped air bubbles in the cementitious mixture 20 during the transfer process. The present invention also contemplates other types of transfer devices 24 and methods of transferring the cementitious mixture.

When a sufficient quantity of castable cementitious mixture 20 is deposited into the external mold form 16, the internal mold form 18, FIG. 2B, is aligned with the external mold form 16, e.g., using a hoist-trolley, and inserted into the external mold form 16. The internal mold form 18 can include an additional vibrating mechanism 28 that preferably imparts a rotational vibration along the length of the internal mold form 18 to compliment the generally vertical vibration of the vibrating mechanism 26 and further facilitate insertion of the internal mold form 18 into the cementitious mixture 20. When pressing the internal mold form 18 into the mixture 20 by hand, both vibrating mechanisms 26, 28 are preferably activated.

The castable cementitious mixture 20, FIG. 2C, is displaced by the internal mold form 18 such that the cementitious mixture 20 extends between the external mold form 16 and internal mold form 18 in the shape of the hollow, decorative article. The external mold form 16 can include one or more protruding regions 15, 17, for forming apertures and/or recessed surface regions in the hollow, decorative article. The protruding regions 15 can also contact the internal mold form 18 and align the internal mold form 18 within the external mold form 16. Other mechanisms can also be used to align and secure the internal mold form 18 in the external mold form 16, as will be described in greater detail below.

The castable cementitious mixture 20 is maintained between the external mold form 16 and internal mold form 18 until the cementitious mixture partially cures to form the hollow, decorative article 30, FIG. 2D. Typically, the initial setting of the cementitious mixture 20 in the mold 14 takes about 20 to 26 hours and is performed at room temperature. The article is preferably removed when the article can be green handled without collapsing or crumbling but before the outer surface region of the article begins to cure.

The above method of displacing the castable cementitious mixture 20 using an internal mold form 18 inserted into an external mold form 16 minimizes air entrapment and increases the strength and surface quality of the molded article as well as facilitating the time and labor required to mold the articles. The preferred castable cementitious mixture described above has a relatively low density and foam-like characteristics suitable for hollow-casting using this displacement technique. The present invention, however, contemplates other casting techniques using the castable cementitious mixture described above The hollow, decorative article 30 includes walls 32a, 32b formed between the external mold form 16 and internal mold form 18. The walls 32a, 32b define a hollow region 34 formed by the internal mold form 18. One embodiment of the article includes apertures 36a, 36b that are formed by protruding regions 15 and extend through walls 32a, 32b of the article 30 into the hollow region 34 to provide venting of the hollow region 34, e.g., when the hollow, decorative article 30 is used as a cover for utility installations. Another embodiment of the article 30 further includes a recessed region 38 formed in a top portion 37 of the article 30 by protruding region 17. The recessed region 38 can hold water, soil, stones, or other materials, allowing the article 30 to be used as a birdbath or planter.

The hollow, decorative article 30 preferably includes an outer surface region 39 having a decorative texture, as will be described in greater detail below. The method also includes "green" finishing operations performed after the article 30 is removed from the external and internal mold forms 16, 18 including, but not limited to, rinsing, carving, boring, trimming, and dressing. The combination of perlite with cement in the article 30, and in particular when the retarding/parting agent is used, facilitates "green" finishing because the outer surface region 39 of the article is abradable when fresh out of the mold. The article is preferably hosed down and/or brushed or scraped to remove the retarding/ parting agent and excess slurry at the surface region of the article, resulting in a decorative surface texture that simulates fine-grained granite. The addition of hard aggregates, such as baked shale or fine masonry sand, would make the article more abrasion resistant but will inhibit the ability of carving and other finishing operations on the article. Other "green" finishing operations include further cutting or removing material from the apertures 36a, 36b and knife trimming casting flaws.

After finishing, the article 30 is cure stored, for example, by wrapping in a plastic film and storing at room temperature or higher for about one week or longer. After cure storage, final finishing operations can be performed such as burning down any fibrous material exposed at the surface region of the article, forming melted fiber that simulates mineral deposits in the stone-like texture of the article. Another final finishing operation includes applying a patina to the surface of the article for coloration simulating lichen or other natural colorations. One example of a patina formula includes cement, water, and one or more pigments, such as masonry color #891 Black and/or masonry color #719 Light Chocolate made by Euclid Chemical Co. A further final finishing operation includes applying a concrete sealer, such as an architectural grade cement sealer sold under the trademark DIAMOND CLEAR VOX by Euclid Chemical Co.

Figure 3:
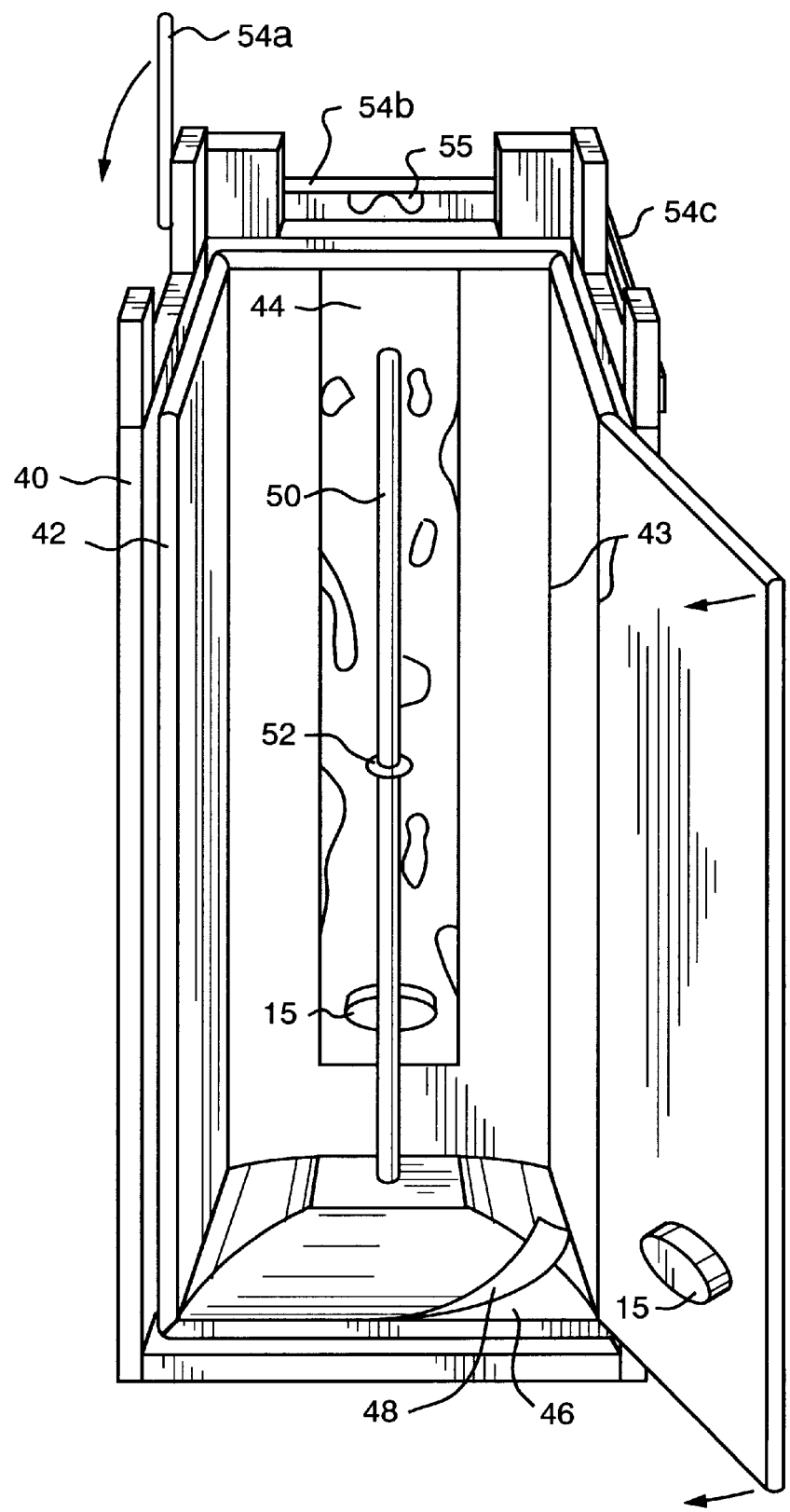
FIG. 3 is a side perspective view of the external mold form, according to one embodiment of the present invention.

The preferred embodiment of the external mold form 16, FIG. 3, includes an external mold form support 40 and an external mold form liner 42. One example of the external mold form support 40 includes a plurality of panels coupled together with clamps or other coupling mechanisms.

The external mold form liner 42 is preferably made of a lightweight flexible foam, such as a polyethylene foam that has been extruded as a sheet and carved, and is foldable to fit within the external mold form support 40 to form the external mold form 16. Another example of a lightweight flexible foam includes a polyurethane foam, such TC-281 A/B FR, an integral skinning, high modulus, medium density flexible foam manufactured by BJB Enterprises, Inc. of Tuston, Calif. The external mold form liner 42 includes one or more textured or contoured surfaces 44 that form corresponding textured or contoured surface in the molded article. The external mold form liner 42 also includes the protruding regions 15 that form the apertures in the molded article.

Making the external mold form liner 42 out of polyurethane or other suitable castable or carvable foams allows textured or contoured surfaces 44 and protruding regions 15 to be easily formed according to various possible designs. The flexibility and light weight of the external mold form liner 42 also allows for easy removal, handling, transportation and preparation, e.g., preparing with the retarding/ parting agent, as described above, or rinsing or cleaning after casting an article. The external mold form liner 42 is formed with hinges 43 such that the external mold form liner 42 can be removed from the rigid support 40, unfolded, prepared and/or cleaned, and folded back into place in the rigid support 40. The foam material used for the external mold liner 42 also has insulating properties that helps to control the speed of initial curing by maintaining the mixture at a warm constant temperature, and thus ensures predictable initial cure times and form stripping or removal times.

The external mold form 16 further includes a head mold form 46 that forms the top region of the molded article. The head mold form 46 can include the protruding region 17, as described above, that forms a recessed region in the top of the molded article, for receiving water, earth, sand, stones and the like e.g., when the molded article is used as a birdbath or planter. The head mold form 17 can be made of a fiberglass composite of polyester or epoxy resin, or from solid flexible polyurethane of mid to high durometers, such as PMC 780 liquid rubber manufactured by The Smooth-On Co. of Gillette, N.J. Alternatively, the head mold form 46 can be flat or recessed to form flat, peaked or domed top regions of other shapes in the articles.

A head mold form liner 48, such as a thin mesh reinforced silicone rubber liner, is preferably disposed over the head mold form 46. The head mold form liner 48 is preferably prepared with a parting agent, such as the type sold under the trademark EUCO SUPER SLIP made by Euclid Chemical Company, or other conventional petroleum based parting agents. The parting agent facilitates separation of the molded article from the head mold form liner 48 and head mold form 46 after casting. A small amount of chalk or silicone dioxide powder is preferably applied under the head mold form liner 48 to break friction with the head mold form 46 such that the head mold form liner 48 easily fits over the head mold form 46. The head mold form liner 48 ensures the gentle release of the form stripping or removal while the cementitious composition is still green. A gasket or sealing flange can be provided separate from or integral with head mold form 46 or liner 48 to seal against the walls of the external mold form liner.

In one example, a guide member 50 (also known as a gagger) is secured in the head mold form 46 in a substantially vertical position to guide the internal mold form 18 into the external mold form 16. The guide member 50 can include one or more rigid rods, such as a ¼ inch brass pipe fitted with a fiberglass extension rod, that are coated with a parting agent, such as a conventional petroleum based parting agent. An O ring 52 is preferably disposed around the guide member 50 to seal against the internal mold form 18. The rigid rods also act to form a hole through the top region of the molded article, e.g., to act as a drainhole that can be plugged when the article is a birdbath or planter.

The present invention also contemplates other types of guide members or mechanisms for aligning the internal mold form 18 within the external mold form 16. For example, in the embodiment where protruding regions 15 extend from the external mold form liner 42, the protruding regions 15 act to align the internal mold form 18 and the guide member 50 is unnecessary. Alternatively, one or more swing arms 54a–54c are pivotally coupled to the external mold form support 40 such that the swing arms 54a–54c pivot downwardly to secure and align the internal mold form 18 within the external mold form 16.

Figure 4:
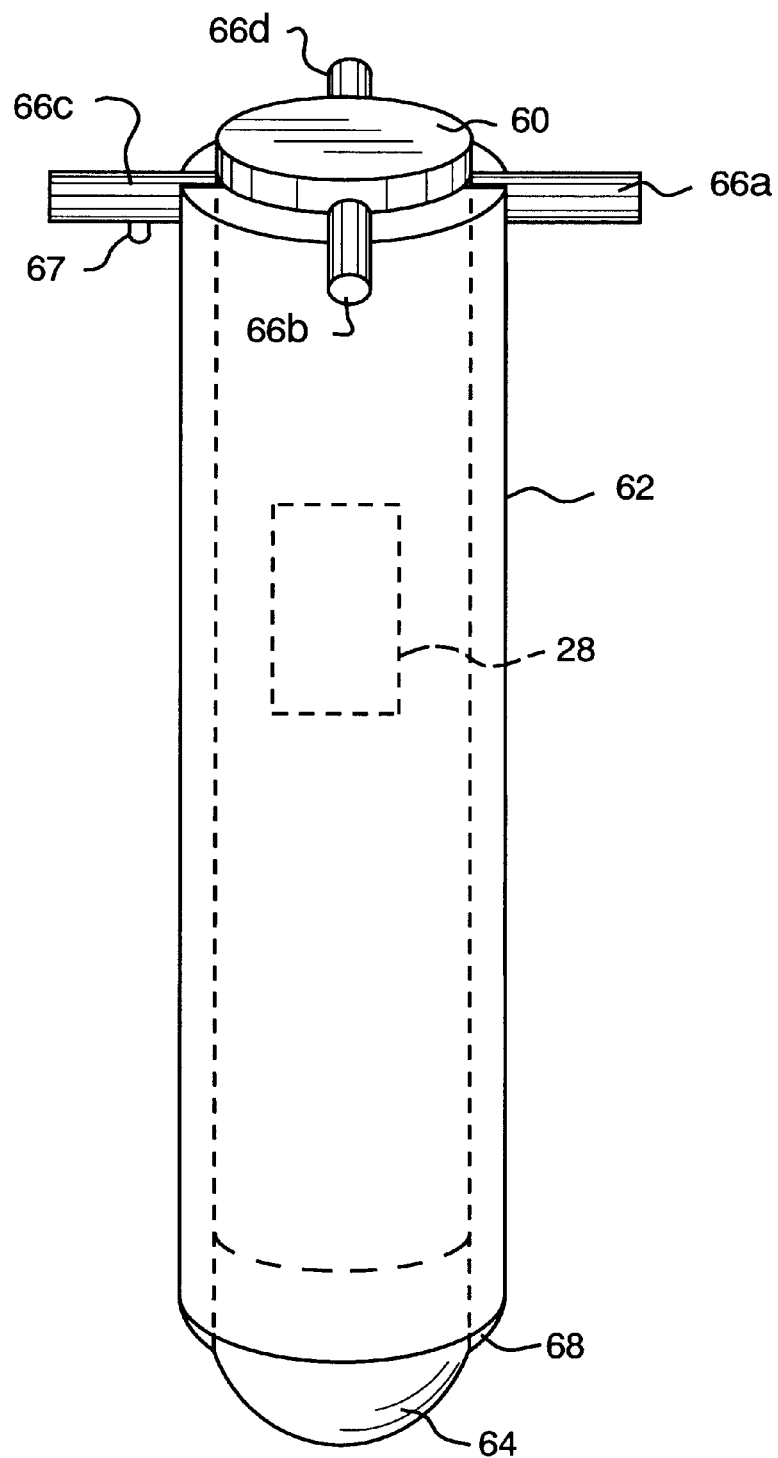
FIG. 4 is a side perspective view of the internal mold form, according to one embodiment of the present invention.
Figures 5A, 5B, 5C, 5D:
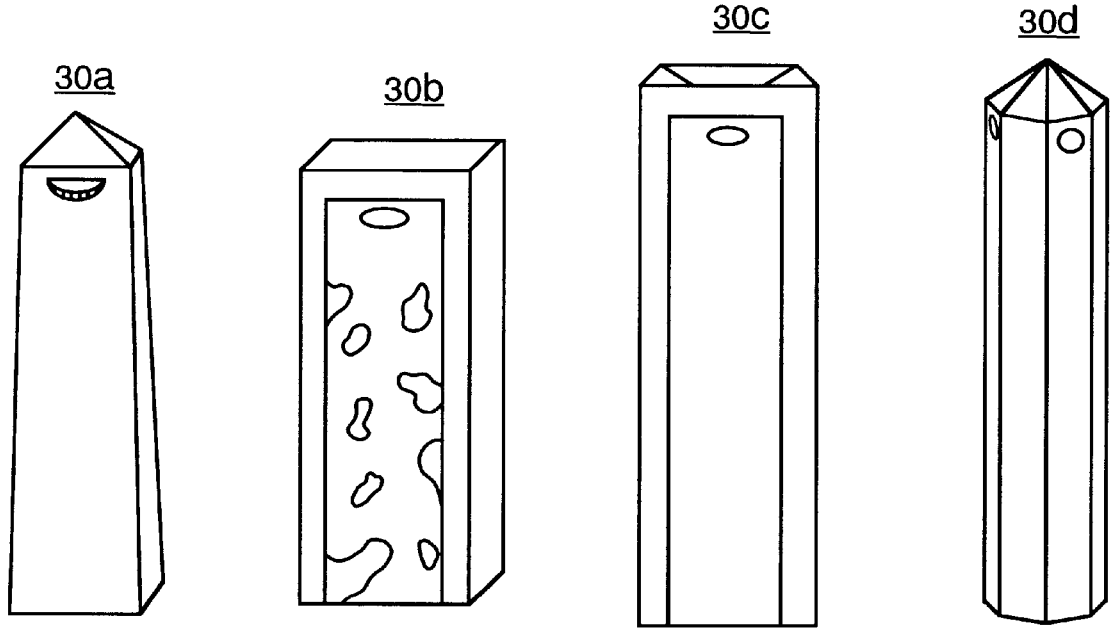
FIGS. 5A–5G are perspective views of various embodiments of molded, decorative articles made according to the method of the present invention.
Figures 5E, 5F, 5G:
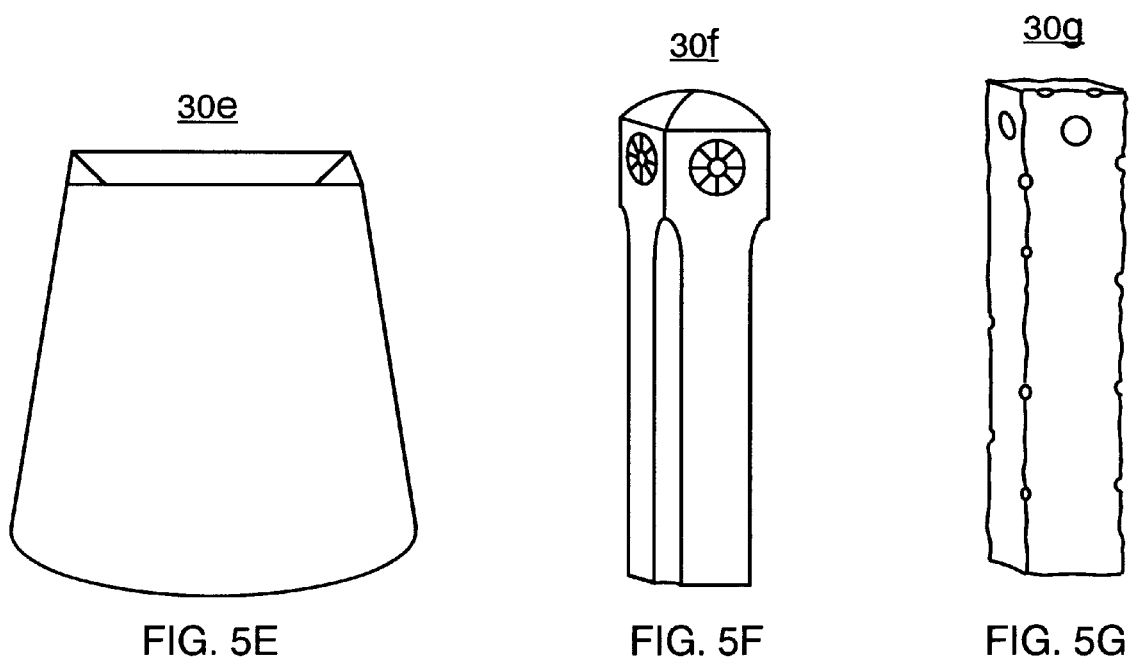

The preferred embodiment of the internal mold form 18, FIG. 4, includes an internal mold form core 60 and an internal mold form liner 62 disposed around the internal mold form core 60. The internal mold form core 60 has sufficient weight to facilitate displacement of the cementitious mixture during casting. In one example, the internal mold form core 60 has a generally tapered shape, e.g. about 1.5 to 3°, that facilitates removal of the internal mold core form 60 from the liner 62 after molding. The present invention contemplates various shapes and sizes depending upon the shape and size of the article to be molded. One example of the internal mold form core 60 includes a tapered plastic sleeve cast in place over a pipe made of PVC or a similar material.

At one end, the internal mold form core 60 can include interchangeable head pieces 64 to compliment the various head form designs in the molded articles. One or more handles 66a–66d extend radially from the internal mold form core 60 proximate the other end of the core form 60 to facilitate handling of the internal mold form 18 and guiding into the external mold form 16.

If the internal mold form 18 includes a vibrating mechanism 28 one of the handles 66a–66c can include a switch 67 for activating the vibrating mechanism 28 while displacing the cementitious mixture in the external mold form 16. The swing arms 54a–54c on the external mold form support 40 (FIG. 3) include a handle securing member 55 that is positioned against each of the handles 66a–66d to secure and align the internal mold form 18 within the external mold form 16.

One example of the internal mold form liner 62 is made from a composite of synthetic fabric and polyethylene foam that is lightweight, both flexible and sufficiently stiff, resistant to water and chemicals, and thermally insulated. The present invention also contemplates using a flexible, castable self-skinning polyurethane foam or other suitable materials. The internal mold form liner 62 is preferably dusted with chalk on the inside surface before sliding over the internal mold form core 60.

As described above, a plastic film 68 can be wrapped around the internal mold form liner 62 to act as both a parting agent and sealing agent that seals the cementitious mixture during curing. The plastic film 68 can also be wrapped over the endcap 64 to secure the endcap 64 to the rigid internal mold form core 60. One example of the plastic film 68 is a conventional stretch wrap plastic that can easily be wrapped around the internal mold form liner 62 and end cap 64. The plastic film 68 is preferably wrapped loosely enough so that the plastic film does not recoil and peel away from the surface of the article before curing is complete. The internal mold form 18 optionally includes a foil wrapped around the internal mold form core 60 for reflecting heat back into the mixture.

The use of flexible foams for the internal mold form liner 42 also has the advantages of being light weight, insulating, and flexible. The internal mold form liner 62 can easily be removed and cleaned and/or treated. The light weight nature of the cementitious composition allows the use of light weight foams in both the external and internal mold forms 16, 18.

The external and internal mold forms 16, 18, according to the embodiment of the described above, are easily removed, piece-by-piece, after initial setting of the article is completed. First, the guide member 50 (if used) is removed, and the swing arms 54a–54c are released. The internal mold form core 60 can be removed first leaving the internal mold form liner 62 in place. The internal mold form liner 62 is then removed, e.g. by collapsing or rolling the liner 62 within the hollow region of the article such that the liner 62 separates from the walls of the article within the hollow region. The external mold form support 40 is then removed, and then the external mold form liner 42 is peeled from the article. The head mold liner 48 (when used) can be left in place as a masking and a vapor containing barrier until "green" finishing operations are completed.

The hollow, decorative articles 30a–30g, FIGS. 5A–5G, can be cast in various shapes with various surface ornamentations, e.g. posts, bird baths, planters, and the like. The articles 30a–30g are dimensioned to cover and conceal utility installations and have a decorative shape and surface texture that matches the natural surroundings. Apertures formed in some the articles 30a, 30b, 30c, 30d, 30f, 30g allow the utility installation, such as a vent stack, to vent. Recessed regions formed in some of the articles 30c, 30e are capable of receiving and supporting water, earth or other materials to act as a bird bath or planter.

Accordingly, the hollow, decorative articles cast according to the method of the present invention are structurally sound and weather resistant as well as light weight and decorative. The castable cementitious mixture including perlite and cement provides the desired structural and aesthetic properties while also facilitating the casting of the articles in various shapes by displacing the castable cementitious mixture between external and internal mold forms.

Modifications and substitutions by one of ordinary skill in the art are considered to be within the scope of the present invention which is not to be limited except by the claims which follow.

What is claimed is:

1. A method for making a molded article from a cementitious composition, said method comprising:

mixing a castable cementitious mixture including an aqueous slurry of at least cement and perlite;

transferring a quantity of said castable cementitious mixture into an external mold form;

inserting an internal mold form into said external mold form and said quantity of said castable cementitious mixture, for displacing said quantity of said castable cementitious mixture between said internal mold form and said external mold form such that said castable cementitious mixture flows into a space between side surfaces of said internal mold form and said external mold form to form walls of said molded article;

maintaining said castable cementitious mixture between said internal mold form and said external mold form until said castable cementitious mixture at least partially cures to form said molded article; and removing said molded article from said mold.

2. The method of claim 1 wherein said castable cementitious mixture includes said at least cement and perlite in a perlite/cement ratio of about 4:1 by volume.

3. The method of claim 1 wherein said cement includes portland cement.

4. The method of claim 1 wherein said castable cementitious mixture further includes an air entraining agent, for entraining air bubbles and reducing a density of said castable cementitious mixture to facilitate displacement of said castable cementitious mixture by said internal mold form.

5. The method of claim 1 wherein said castable cementitious mixture further includes a fibrous material, for reinforcing said castable cementitious mixture of said at least concrete and perlite.

6. The method of claim 5 wherein said fibrous material includes polypropylene fibers.

7. The method of claim 1 wherein the step of mixing said castable cementitious mixture includes:

adding water to a heated mixing apparatus;

mixing an air entraining agent into said mixing apparatus until said air entraining agent is dispersed in said water;

mixing said cement into said mixing apparatus until a cementitious slurry is formed;

mixing said perlite into said cementitious slurry in said mixing apparatus until a cementitious perlite slurry is formed with entrained air; and mixing a fibrous material into said cementitious perlite slurry in said mixing apparatus, for forming said castable cementitious mixture.

8. The method of claim 7 wherein said water is preheated.

9. The method of claim 7 wherein the step of mixing said perlite into said cementitious slurry includes feeding said perlite into said cementitious slurry with a material feeding device.

10. The method of claim 7 further including the step of rinsing perlite and concrete from walls of said mixing apparatus.

11. The method of claim 1 further including a step of preparing said external mold form with a retarding/parting agent, for preventing hardening of said castable cementitious mixture at an outer surface of said molded article.

12. The method of claim 11 wherein said retarding/parting agent includes a mixture of at least sugar, glue and solvent alcohol.

13. The method of claim 11 wherein said external mold form is made of a light weight flexible material, and wherein the step of preparing said external mold form with a retarding/parting agent includes unfolding said external mold form.

14. The method of claim 13 wherein said external mold form is made of a light weight flexible foam material.

15. The method of claim 1 wherein said internal mold form is made of a light weight flexible foam material.

16. The method of claim 1 further including a step of preparing said internal mold form with a parting agent.

17. The method of claim 15 wherein said parting agent includes a plastic film.

18. The method of claim 1 further including a step of finishing a surface of said molded article after removing said external mold form from said molded article.

19. The method of claim 1 further including a step of adding a coloring agent to said molded article.

20. A method for making an article from a cementitious composition, said method comprising the steps of:

mixing a castable cementitious mixture including an aqueous slurry of at least cement and perlite;

preparing a surface of a mold with a retarding agent including a mixture of sugar and glue;

transferring a quantity of said castable cementitious mixture to said mold;

casting said castable cementitious mixture in said mold until said castable cementitious mixture substantially cures to form said article, wherein said retarding agent slows down curing of said article at an external surface region of said article; and removing said article from said mold.

21. The method of claim 20 wherein said castable cementitious mixture includes said at least cement and perlite in a perlite/cement ratio of about 4:1 by volume.

22. The method of claim 21 wherein said castable cementitious mixture further includes an air entraining agent.

23. The method of claim 22 wherein said castable cementitious mixture further includes a fibrous material.

24. The method of claim 23 wherein said fibrous material includes polypropylene fibers.

25. The method of claim 20 wherein said mixture further includes a solvent alcohol.

26. The method of claim 20 wherein said retarding agent further includes a pigment agent, for indicating density of application of said retarding agent.

27. The method of claim 11 further including finishing said outer surface region of said article upon removal of said article from said mold.

28. The method of claim 1 wherein said step of transferring said quantity of said castable cementitious mixture into an external mold form includes:

positioning a transfer device containing said quantity of said castable cementitious mixture proximate a bottom region of said external mold form; and releasing said quantity of said castable cementitious mixture from said transfer device while maintaining said quantity of said castable cementitious mixture as one contiguous mass.

29. The method of claim 28 further including the step of imparting vibrations to said bottom region of said external mold form to minimize entrapped air in said quantity of said castable cementitious mixture in said bottom region of said external mold form.

30. The method of claim 29 further including the step of imparting rotational vibrations to said internal mold form while inserting said internal mold form into said external mold form and said quantity of castable cementitious mixture to facilitate insertion of said internal mold form into said quantity of castable cementitious mixture.

* * * * *